United States Patent Office  
2,953,500  
Patented Sept. 20, 1960

2,953,500  
PRODUCTION OF EXTRACELLULAR INVERTASE BY CERTAIN STRAINS OF YEASTS

Robert G. Dworschack and Lynferd J. Wickerham, Peoria, Ill., assignors to the United States of America as represented by the Secretary of Agriculture No Drawing. Filed Aug. 18, 1958, Ser. No. 755,814  
2 Claims. (Cl. 195—65)  
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of an enzyme product having high invertase activity for certain yeasts known as Saccharomyces, Candida, Saccharomycodes, Schizosaccharomyces, Zygosaccharomyces, Endomycopsis, Torulaspora, Kluyveromyces and Debaryomyces.

The invertase enzyme product is prepared by propagating yeast of the species known to produce considerable amounts of extracellular invertase in a liquid medium, separating the yeast cells from the clear broth, and evaporating the broth to obtain the invertase preparation in the form of a sirup or solid.

Invertase is used to produce non-crystallizable invert sugars from sucrose for the food and baking industries. The enzyme is used in the confectionery industry to make soft centers in chocolate coated candies, and by the paper industry to make levulose for use as a plasticizing agent. Invertase is also used in the preparation of D-fructose from inulin, meliboise from raffinose, gentiobiose from gentianose, and phosphorylated hexose from sucrose monophosphate. It is employed in the identification of sucrose and related oligosaccharides, and in industrial fermentations in which cane molasses is fermented by microorganisms which lack the ability to produce an adequate amount of invertase to hydrolyze the sucrose in the molasses.

The advantages of the invertase products of our invention over the invertase products of the prior art in which the invertase products are prepared by the autolysis of yeast cells, are their greater purity, greatly reduced adulteration by other enzymes and proteins, and freedom particularly from melibiase. An additional advantage is that extracellular invertase preparations may be produced from the effluent liquors of a food or feed yeast plant.

This invention demonstrates that a number of sucrose-fermenting yeasts produce extracellular invertase. Table III, column 4, contains data on the production of this enzyme by a few species of industrially important yeasts. For illustrative purposes, these yeasts are grown in liquid medium containing assimilable carbohydrate and nitrogen by either aerated and agitated deep-tank culture or anaerobic culture conditions at 20 to 35° C. as commonly practiced in the art. The yeast cells are then removed by centrifugation and the clear broth is concentrated by evaporation under vacuum to approximately ⅕ its original volume and the solids obtained by lyophilization. The broth may be concentrated by evaporation to form a sirup. These preparations are eminently suitable for use as a source of the invertase enzyme.

The invention is further demonstrated by the following examples.

EXAMPLE 1

The yeast, *Saccharomyces uvarum* NRRL Y-972, was taken from lyophil culture and transferred daily on an agar medium composed of 2 percent sucrose, 0.3 percent yeast extract, and 0.5 percent peptone. The slants were incubated for 24 to 48 hours at 28° C., the incubation temperature employed in all experimental work reported here. The composition of the liquid medium used to prepare inoculum, as well as invertase solutions, are similar to that of the agar medium with the exception of 1 percent additional sucrose and omission of the agar. The medium was adjusted to pH 6.0 with sulfuric acid before sterilization. The Erlenmeyer flasks were stoppered with cotton plugs and the Fernbach flasks were capped with 6 milk filter pads each. All flasks were sterilized by autoclaving at 121° C. for 25 minutes.

The liquid inoculum was prepared by washing the cells of a slant culture into 5 ml. of sterile water and transferring 1 ml. of the suspension into a 500 ml. Erlenmeyer flask containing 100 ml. of medium. After 24 to 48 hours incubation, 25 ml. were used to inoculate 500 ml. of medium in Fernbach flasks which were used in all of the laboratory studies and for the subsequent inoculation of 20-liter stainless steel fermentors. The flasks were incubated on a reciprocating shaker making ninety 3-inch cycles per minute. A modification of the Sumner and Howell method (J. Biol. Chem., 108:51 (1935)) was used to determine invertase activity. The assay consisted of pipetting 5 ml. of 6.5 percent sucrose in acetate buffer into a 300 ml. Erlenmeyer flask and allowing it to come to 20° C. in a water bath. One milliliter of enzyme solution was added as rapidly as possible. The flask was shaken and allowed to remain for 1 hr. at 20° C. after which 50 ml. of the Shaffer-Hartmann copper reagent (J. Biol. Chem., 45: 349 (1921)) for the determination of reducing sugars was added to stop further hydrolysis. The number of mgs. of invert sugar formed in 1 hour at 20° C. and pH 4.5 expresses directly the invertase activity of one milliliter of culture broth.

The buffer solution was prepared by dissolving 5.85 g. of sodium acetate trihydrate and 57 ml. of N acetic acid in distilled water and diluting to one liter. The sucrose-buffer solution was prepared by dissolving 6.5 g. sucrose in acetate buffer to make 100 milliliters.

Direct microscopic counts of live and dead cells were made according to the methylene blue staining procedure of mills (Food Res., 6: 361 (1941)).

To prove that the extracellular invertase was produced by living cells rather than liberated from dead cells, the following laboratory study was made. Five hundred milliliters of medium in each of two Fernbach flasks was inoculated and incubated under aerobic culture conditions as previously described. Fourteen hours after inoculation growth was abundant and samples were withdrawn for assay of invertase activity and for live and dead cell counts. Twenty-five milliliters of toluene was added to one flask and the cotton enclosure was replaced by a rubber stopper to prevent evaporation of the toluene. A second and similar culture received no toluene. Both were again placed on the shaker and aliquots of each were withdrawn at intervals and assayed. The data are given in Table I. It will be noted that the culture without toluene contained relatively few dead cells but instead many live and actively growing cells which produced extracellular invertase at a rapid rate throughout the first 90 hours. However in the other flask, the rapid rise in extracellular invertase stopped shortly after the yeast cells were killed with toluene. These data also show that liberation of the enzyme from dead cells and from autolyzed cells was very slight indeed during the remaining 186 hours of the experiment. In addition, 26 percent of the yeast cells were autolyzed, as represented by the decrease in cell counts, but the invertase activity in the filtrate changed very little. This, it is shown that enzyme activity increased as the number of actively fermenting live yeast cells increased.

Table I.—*Secretion of invertase by living and dead yeast Y–972 under anaerobic culture conditions*

| Time, hrs. | Untreated Culture | | | Treated Culture (Toluene Added) | |
|---|---|---|---|---|---|
| | Live Yeast Cells, ×10⁶ | Dead Yeast Cells, ×10⁶ | Invertase Activity, in Filtrate, units/ml. | Dead Yeast Cells, ×10⁶ | Invertase Activity, in Filtrate, units/ml. |
| 14 | 93.3 | 1.5 | 26.2 | 98.8 | 25.6 |
| 26 | 201.0 | 7.5 | 59.0 | 90.5 | 32.8 |
| 49 | 300.0 | 10.5 | 83.8 | 88.5 | 34.6 |
| 73 | 349.2 | 11.5 | 92.6 | 85.3 | 30.8 |
| 97 | 366.7 | 13.5 | 101.8 | 78.2 | 32.2 |
| 200 | 375.0 | 13.5 | 123.4 | 71.6 | 33.7 |

Enzyme control in presence of toluene: Activity of filtrate, 58.9 units/ml.; activity of filtrate treated with toluene for 200 hrs., 59.1 units/ml.

EXAMPLE 2

One-liter Erlenmeyer flasks containing 200 milliliter of medium were inoculated as described in Example 1. The flask was incubated in still culture under anaerobic conditions. Samples were withdrawn from time to time and assayed for invertase activity. The data are given in Table II.

Table II.—*Secretion of invertase by S. uvarum NRRL cells under aerobic culture conditions*

| Time, Hrs. | Live Yeast Cells, ×10⁶ | Dead Yeast Cells, ×10⁶ | Invertase Activity, in Filtrate, Units/mg. |
|---|---|---|---|
| 25 | 13.2 | 0.7 | 6.5 |
| 47 | 80.7 | 2.4 | 27.7 |
| 94 | 93.2 | 3.3 | 40.7 |
| 189 | 124.0 | 5.2 | 47.4 |

EXAMPLE 3

Unisexual forms of *Saccharomyces kluyveri* and closely related species may be produced by streaking the haploid mating types on YM agar plates. When the well-isolated colonies are approximately 17 days old secondary colonies appear on the surface of the primary colonies. When the cultures are 20 to 30 days old, the secondary colonies are of two colors, white and brown. The white colonies are generally unisexual diploids or tetraploids, and the brown variants are believed to be mainly unisexual triploids. The secondary colonies are restreaked for purity. The brown isolates are commonly unstable, but may be stabilized by the following procedure.

Isolates are inoculated at three equidistant points forming the tips of a triangle on the surface of each of two petri dishes using a sharp, bent needle. The plates are incubated for 20 to 30 days at 25° C. Cells are taken from the outside edge of a sector which is of the same appearance and continuous with the growth occurring at the center of one of the six colonies. The cells are used to inoculate a second set of plates. Mature colonies of the second or third serial plating are usually homogeneous in appearance, thus indicating stability. Such cultures may be lyophilized to maintain stable cultures indefinitely. For illustrative purposes, *Saccharomyces kluyveri* Code 3 was grown in 200 milliliter medium contained in a 1-liter Erlenmeyer flask under the culture conditions cited in Example 1. Samples were withdrawn at varying intervals and assayed for invertase activity. The data showed that 1310.0 and 1906.0 units of invertase were elaborated in the medium in 114 and 163 hours, respectively. These figures are very much higher than for any other type of yeast studied.

Table III.—*Yeast species which produce extracellular invertase*

| Name of Culture | Number | Invertase Activity, units/ml. | |
|---|---|---|---|
| | | Aerobic | Anaerobic |
| *Saccharomyces kluyveri* (unisexual haploid) | Y-4288-7H1 | 298.4 | |
| Do | Y-4288-13H2 | 253.6 | |
| *Saccharomyces kluyveri* (unisexual diploid) | Y-4288-7D2 | 337.2 | |
| Do | Y-4288-13D2 | 360.8 | |
| *Saccharomyces kluyveri* (unisexual polyploid) | Y-4288-Code 3 | 791.6 | 162.8 |
| Do | Y-4288-Code 4 | 491.0 | 267.2 |
| Do | Y-4288-Code 15 | 380.5 | 223.6 |
| Do | Y-4288-Code 18 | 278.5 | 434.4 |
| Do | Y-4288-Code 20 | 580.0 | 201.2 |
| Do | Y-4288-Code 25 | 385.0 | 465.2 |
| Do | Y-4288-Code 27 | 385.0 | |
| *Saccharomyces kluyveri* (bisexual diploid) | Y-4288-7H1X13H2 | 13.1 | |
| *Saccharomyces kluyveri* (bisexual triploid) | Y-4288-7D2X13H2 | 24.3 | |
| *Saccharomyces kluyveri* (bisexual tetraploid) | Y-4288-7D2X13D2 | 25.1 | |
| *Candida (Torulopsis) utilis* | Y-900 | 243.6 | 10.0 |
| *Candida (Torulopsis) utilis* v. *thermophila* | Y-1082 | 209.0 | 15.4 |
| *Candida (Torulopsis) utilis* v. *major* | Y-1084 | 134.0 | 18.7 |
| *Torulopsis colliculosa* | Y-172 | 210.8 | 7.1 |
| *Saccharomyces uvarum* | Y-972 | 138.0 | 51.0 |
| *Saccharomyces validus* | Y-1374 | 53.9 | 26.0 |
| *Saccharomyces fragilis* | Y-1109 | 38.3 | 8.3 |
| *Saccharomyces oviformis* | Y-1356 | 36.0 | 20.8 |
| *Saccharomyces cerevisiae* | Y-898 | 31.6 | 45.4 |
| *Saccharomyces lactis* | Y-1205 | 27.7 | 30.7 |
| *Saccharomyces carlsbergensis* | Y-379 | 5.7 | 4.0 |
| *Zygosaccharomyces ashbyi* | Y-1598 | 84.0 | 63.4 |
| *Kluyveromyces polysporus* | Y-2399 | 54.6 | 54.2 |
| *Torulaspora rosei* | Y-1567 | 50.6 | 7.1 |
| *Schizosaccharomyces japonicus* | Y-1361 | 41.3 | 38.6 |
| *Saccharomycodes ludwigii* | Y-974 | 14.0 | 16.7 |
| *Endomycopsis chodati* | Y-1933 | 13.1 | 3.5 |
| *Endomycopsis fibuliger* | Y-25 | 2.9 | 26.8 |
| *Candida flareri* | Y-1476 | 5.4 | 15.4 |
| *Debaryomyces kloeckeri* | Y-833 | 0 | 20.5 |

Incubation temperature: 28° C. Incubation time: 144 hours.

EXAMPLE 4

The production of extracellular invertase in 20-liter stainless steel fermentors was studied. The description and operation of the fermentors are described by Dworschack, Lagoda and Jackson (Applied Microbiology, 2: 190-197 (1954)). One of the media used in the fermentors consisted of 3 percent sucrose, 0.3 percent yeast extract, and 0.2 percent acid hydrolyzed wheat gluten. The medium was sterilized for 10 minutes at 130° C. Inoculum for the fermentations was prepared as described in Example 1. A total of 10 liters of inoculated medium was used in each fermentor. The culture conditions consisted of a temperature of 28° C., an agitator rate of 200 r.p.m., and an aeration rate of 0.25 volume of air/volume or medium/minute without head pressure. The fermentors each contained 4 baffles and one stone sparger. Two and one-half milliliters of silicone antifoam were added at the beginning of the fermentation and once again 16.5 hours later to prevent excessive foaming.

The progress of the fermentation was followed by withdrawing small samples at varying times for invertase analysis. The results showed that 91.6 units of extracellular invertase were produced during 97 hours. These results compare favorably with those obtained from the laboratory studies.

EXAMPLE 5

Since invertase is a constitutive enzyme, it is important to determine the amount of extracellular invertase a yeast will produce in media containing a carbohydrate other than sucrose. An industrially-important yeast, *Candida (Torulopsis) utilis* and varieties *major* and *thermophila* were selected for study. This species and its varieties are used for the production of food and feed yeast from molasses especially in tropical countries, and from glucose and pentose containing sulfite waste liquors in temperate countries. The conversion of industrial wastes into useful products by fermentation is becoming increasingly important. The recovery of invertase from the fermented effluents would make these processes more profitable.

For illustrative purposes, the culture, *Candida utilis*, NRRL Y-900, commonly used in sulfite liquor, and Y-1082 and Y-1084, commonly used in molasses, were used in this study. The yeasts were taken from lyophil culture and transferred twice at 24-hour intervals on an agar medium containing 1-percent glucose or 1-percent sucrose, 0.3-percent yeast extract, 0.3-percent malt extract, and 0.5-percent peptone. One hundred ml. of medium containing 3-percent glucose or 3-percent sucrose, 0.3-percent yeast extract, and 0.5-percent peptone in 500 ml. Erlenmeyer flasks were inoculated and incubated as described in Example 1. Samples were withdrawn from time to time and assayed for invertase activity. The data shown in Table IV indicate that glucose in the medium instead of sucrose did not materially affect the production of extracellular invertase. Indeed, the three yeasts produced slightly more enzyme activity in a glucose medium than strains grown in a sucrose medium.

Table IV.—*Effect of glucose on production of extracellular invertase by certain yeasts grown in aerobic culture*

| Name of culture | No. | Invertase activity | |
|---|---|---|---|
| | | Glucose | Sucrose |
| *Candida (Torulopsis) utilis* | Y-900 | 369.0 | 354.0 |
| *Candida (Torulopsis) utilis* v. *thermophila* | Y-1082 | 178.0 | 170.0 |
| *Candida (Torulopsis) utilis* v. *major* | Y-1084 | 131.0 | 113.0 |

We claim:

1. The process of preparing concentrated extracellular invertase compositions which comprises the cultivation of a species of yeast selected from the group consisting of Saccharomyces kluyveri (unisexual forms) Candida (Torulopsis) utilis and varieties major and thermophila, Torulopsis colliculosa, Saccharomyces uvarum, Saccharomyces validus, Saccharomyces fragilis, Saccharomyces oviformis, Saccharomyces lactis, Saccharomyces carlsbergensis, Zygosaccharomyces ashbyi, Kluyveromyces polysporus, Schizosaccharomyces japonicus, Torulaspora rosei, Saccharomycodes ludwigii, Endomycopsis fibuliger, Endomycopsis chodati, Candida flareri, and Debaryomyces kloeckeri in a carbohydrate medium containing assimilable nitrogen, separating the unautolyzed yeast cells from the broth and preparing from the cell-free broth an enzyme composition with the desired content of invertase.

2. The process of claim 1 in which the yeast species is cultivated in a carbohydrate medium selected from a group consisting of sucrose, glucose and maltose.

References Cited in the file of this patent

UNITED STATES PATENTS 1,919,676     Wallerstein _____ July 25, 1933

OTHER REFERENCES

Chemical Abstracts, vol. 19, page 3095 (1925).

UNITED STATES PATENT OFFICE
CERTIFICATE OF CORRECTION

Patent No. 2,953,500             September 20, 1960

Robert G. Dworschack et al.

It is hereby certified that error appears in the printed specification of the above numbered patent requiring correction and that the said Letters Patent should read as corrected below.

Column 1, line 34, for "meliboise" read -- melibiose --; column 2, line 71, for "This" read -- Thus --; column 3, Table I, in the title thereto, line 2, for "Y-972 under anaerobic" read -- cells under aerobic --; same column, Table II, in the title thereto, line 1, after "NRRL" insert -- Y-972 --; line 2 of the title, strike out "cells"; same line, for "aerobic" read -- anaerobic --; columns 3 and 4, Table III, first column thereof, under the heading "Name of Culture", line 19, for "Saccharomyces urarum" read -- Saccharomyces uvarum --.

Signed and sealed this 11th day of April 1961.

(SEAL)

Attest:
ERNEST W. SWIDER
Attesting Officer

ARTHUR W. CROCKER
Acting Commissioner of Patents